Figure 1:
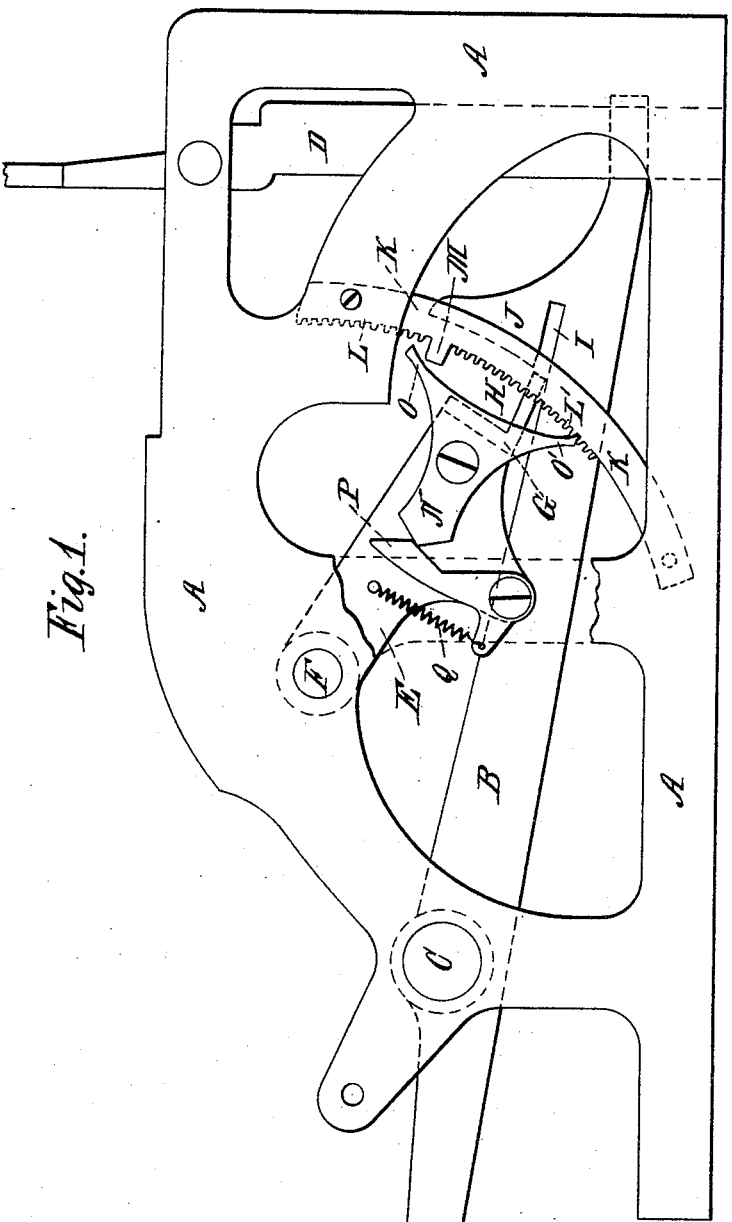

(No Model.)

F. J. PATTERSON.
KEY ARRESTER FOR CASH INDICATORS.

No. 437,236. Patented Sept. 30, 1890.

Witnesses:
W. C. Jirdinston.
Charles Billon.

Inventor:
Frank J. Patterson
by Peck & Reitor
Attorneys.

UNITED STATES PATENT OFFICE.

FRANK J. PATTERSON, OF DAYTON, OHIO, ASSIGNOR TO THE NATIONAL CASH REGISTER COMPANY, OF SAME PLACE.

KEY-ARRESTER FOR CASH-INDICATORS.

SPECIFICATION forming part of Letters Patent No. 437,236, dated September 30, 1890.

Application filed April 21, 1890. Serial No. 348,908. (No model.)

*To all whom it may concern:*

Be it known that I, FRANK J. PATTERSON, a citizen of the United States, residing at Dayton, in the county of Montgomery and State of Ohio, have invented certain new and useful Improvements in Key-Arresting Devices for Cash-Registers, of which the following is a full, clear, and exact description, reference being had to the accompanying drawing, which shows so much of a cash-register as is necessary to illustrate my invention.

A represents one of the side frames of the machine, and B the operating-keys pivoted on the shaft C, extending across the front of the machine, having the usual finger-buttons at their front ends and guided at their rear ends in vertical slots in the cross-frame D, joining the two side frames A. Hung by side arms E on suitable supports at F is a vibrating bar G, extending across the tops of the keys and having a rearwardly-projecting flange H, resting upon the upper sides of the keys immediately in front of slots I in lugs J, formed on the upper sides of the keys. When the front edge of any key is depressed and its rear end lifted, the flange H on the bar G will enter the slot I of the operated key, and the key will be thereby attached to the bar and move with it during its further operation, this owing to the fact that the bar G and the keys are supported on different pivots and move in the arcs of different circles. The forward sides of the lugs J are curved in the arc of the circle traversed by the rear edge of the flange H on the bar G, so that when said bar is moved upward by the operation of a key the flange H moves immediately in front of the curved faces of the lugs J on the unoperated keys and thereby locks all such keys from operation until the operated key and bar G are returned to normal position.

K is a rack-plate secured to the side frame A, and having on its forward side two curved racks L L', with a projection M between them. Pivoted to the side arm E is a pawl N, having two teeth O O', adapted to engage the racks L L', respectively. The other end of the pawl N has oppositely-inclined sides and is engaged by a latch P, pivoted to a lower extension of the side arm E and pressed against the end of the pawl by a spring Q. It results from this construction that the parts being in the position shown in the drawing when any key is operated and the bar G lifted thereby the tooth O' of the pawl N rides over the teeth of the rack L'. If the key be released at any point in its forward stroke, the tooth of the pawl will engage a tooth of the rack and prevent the bar and key moving backward. Just as the key reaches the limit of its stroke and the bar G has moved to its highest position the tooth O' of the pawl strikes the projection M between the racks L L' and is thrown out of engagement with the rack L', while the tooth O is thrown into engagement with the rack L, the opposite end of the pawl N being thrown upward and its lower inclined side engaged by the latch P to hold the pawl in its new position. Upon the return-stroke of the key and bar K the tooth O of the pawl rides over the rack L, and if the key be arrested at any point before reaching normal position and attempted to be moved upward again the tooth of the pawl will engage a tooth of the rack and prevent such movement. Just as the key and bar G reach normal position again the upper tooth O of the pawl strikes the projection M, and is thrown out of engagement with the rack L, while the lower tooth O' is thrown into re-engagement with the rack L', the opposite end of the pawl being thrown downward by this movement and its upper inclined side engaged by the latch P, as shown in the drawing. It will thus be seen that when any key is displaced from normal position it cannot be returned thereto until given its full stroke, and when given such full stroke it cannot be "pumped" back and forth, but must be returned to normal position before it can be given any other movement or any other key be operated. By providing a bar extending across the entire series of keys, to which each key when displaced from normal position becomes attached, and applying the pawl and racks to this bar a single arresting device is made to serve for the entire series of keys.

The construction and arrangement of the parts for attaching the operated keys to the movable bar which carries the pawl are old and not of my invention, and any other suitable means for accomplishing the same end may be employed. Again, as the rack L and the pawl-tooth O and the rack L' and pawl-tooth O' serve distinct purposes, a part of the advantages of my invention may be obtained by the employment of one rack and its corresponding pawl-tooth without the other rack and tooth. In such case a projection on the pawl opposite the one tooth may be employed instead of the second tooth to engage the projection M to throw the tooth into re-engagement with its rack.

Having thus fully described my invention, I claim—

1. In a cash register and indicator, the combination, with the movable bar G and the series of operating-keys B, each of which becomes attached to said bar when displaced from normal position, of the pawl N, having the tooth O and an opposite projection, the rack L, the projection M, arranged to be engaged by the tooth O and projection on the pawl N, and the latch P, whereby retrograde movement of a key during its return-stroke is prevented, substantially as and for the purpose described.

2. In a cash register and indicator, the combination, with the movable bar G and the series of operating-keys B, each of which becomes attached to said bar when displaced from normal position, of the pawl N, having the tooth O' and an opposite projection, the rack L', the projection M, arranged to be engaged by the tooth O' and projection on the pawl, and the latch P, whereby retrograde movement of the key during its positive stroke is prevented, substantially as and for the purpose described.

3. In a cash register and indicator, the combination, with the movable bar G and the series of operating-keys B, each of which becomes attached to said bar when displaced from normal position, of the pawl N, having the two teeth O O', the racks L L', the projection M, and the latch P, substantially as and for the purpose described.

FRANK J. PATTERSON.

Witnesses:
WILLIAM B. SULLIVAN,
FRANK PATTERSON, Jr.